March 17, 1931. E. SCHERER 1,796,726
THERMOSTATICALLY CONTROLLED SWITCH
Filed Feb. 25, 1928
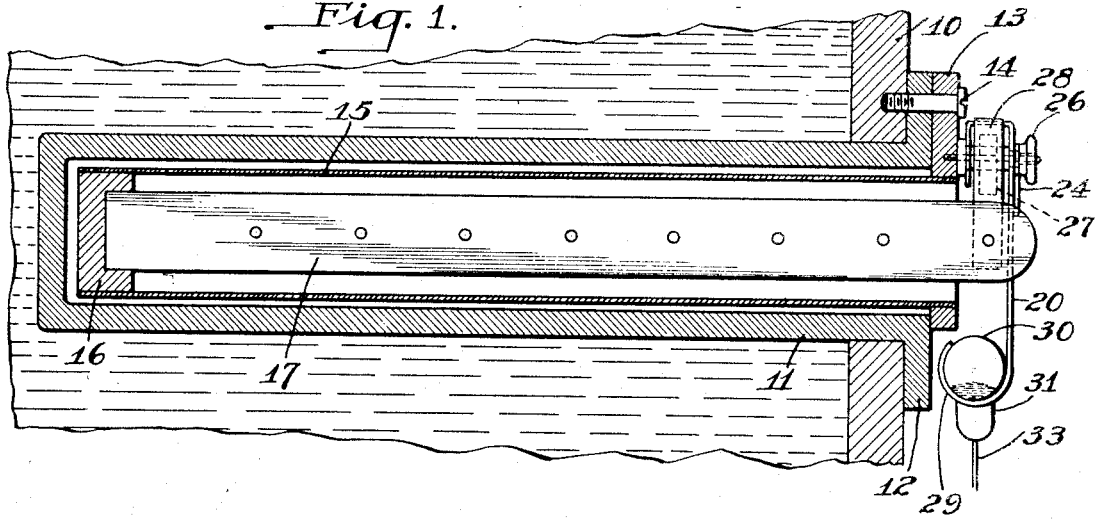
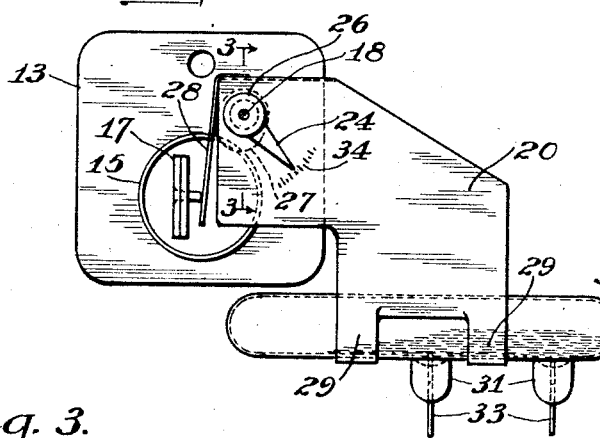
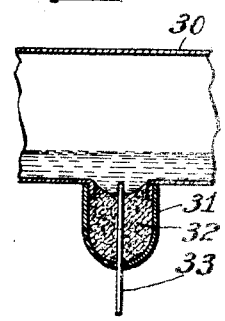
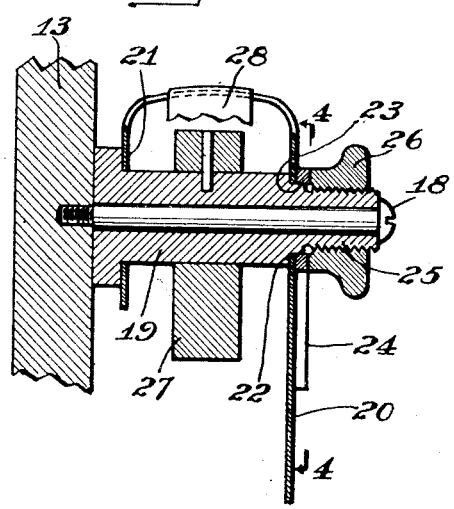
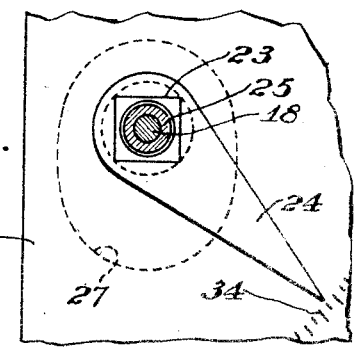
INVENTOR
Edmund Scherer
By Charles G. Cooper
atty.

Patented Mar. 17, 1931

1,796,726

UNITED STATES PATENT OFFICE

EDMUND SCHERER, OF PITTSBURGH, PENNSYLVANIA

THERMOSTATICALLY-CONTROLLED SWITCH

Application filed February 25, 1928. Serial No. 256,910.

My invention pertains to thermostatic-control devices, and particularly to such devices for use with electrically heated hot water systems, and relates especially to hermostatically controlled devices of the character in which a thermostatic element, by the modification of its shape under the action of an increase or reduction of temperature, effects a movement of an electrical switch device, to cut off the heating current when the temperature has reached a predetermined point, and re-establish such current when the temperature falls below the predetermined point.

It is an object of my invention to produce a device of the above character which will be efficient and certain in its effect of cutting off and re-establishing the electrical connection, and in which the possibility of arcing at the electrical contacts, during the breakage or establishment of the circuit, will be obviated. It is another object of my invention to provide a device of this character in which an adjustment, to enable the circuit to be broken or re-established at various temperatures, can be readily and quickly made. It is another object of my invention to provide a device of the above character which will be simple of construction, economical of manufacture, and not likely to get out of order in use.

I have shown in the accompanying drawings, and described in the following specification one form of thermostatically controlled switch device embodying my invention; but it will be understood that my invention may be embodied in other forms and that changes may be made in the form described and shown, without exceeding the scope of invention, as defined in the appended claims.

In the drawing:

Fig. 1 is a sectional elevation, on an enlarged scale, showing a hot-water boiler equipped with a thermostatically controlled switch device, constructed in accordance with my invention;

Fig. 2 is a front view of the device, separated from the boiler;

Fig. 2a is a detail sectional view showing a convenient means for entering the contact wires into the mercury tube;

Fig. 3 is an enlarged section, taken on the line 3—3 of Fig. 2, looking in the direction of the arrows; and Fig. 4 is a section on the line 4—4 of Fig. 3.

Referring now to the drawing:

The reference character 10 indicates a front or side wall of a water boiler or the like, into which is secured, in any desired manner, a hollow tubular casing 11, preferably having, at its outside end, a flange 12. This casing 11 forms a convenient receptacle into which the body of the thermostatic device fits, so that such device will be delicately affected by changes in temperature of the water in the boiler.

The body of the thermostatic device comprises a base 13 which may be secured to the flange 12, as by means of a screw 14 passing through a hole in the base and entering the flange. A tube 15 is secured in a suitable opening in the base 13, this tube being opened at one end, and closed at the other end, as by means of a plug 16. To the plug 16, or such other member that may be employed at the inner end of the tube 15, is secured a thermostatic element, which, in this case, takes the form of a thermostatic strip 17, of well-known character, which will warp one way or the other according to the increase or decrease of the surrounding temperature.

Loosely pivoted upon a screw 18, which enters the base 13, is a bushing 19, which carries a hanger 20. This hanger is bent over, at its top end, to form an ear 21; and the bushing passes through the ear 21 and the body of the hanger, which latter engages against a shoulder 22 formed on the bushing. Beyond the shoulder 22, the bushing is formed with a squared portion 23, upon which is mounted an indicating finger 24. Beyond the squared portion 23, the bushing is formed with a threaded end 25, which receives a thumb nut 26. It will be seen that the finger 24 always maintain its position with respect to the bushing, but that the hanger 20 can be rocked with respect to such bushing, upon the nut 26 being loosened, thereby releasing the pressure of the hanger against the shoulder 22.

Upon the central portion of the bushing 19 is secured a cam member 27, which is adapted to engage a leaf spring 28 secured to the upper bent portion of the hanger. It will be seen, further, that when the hanger is adjusted, by rocking it on the bushing 19, the spring 28 will be engaged to a greater or less extent by the cam member 27, and will thus be caused to extend a greater or less distance beyond the hanger 20. This spring 28 is adapted to be engaged by the end of the thermostatic strip 17, as this strip warps towards it under the effect of an increase in temperature.

The hangar 20 is formed, at its bottom, with a pair of clips 29 for receiving a mercury tube 30. This tube has a contact piece adjacent its center, and one adjacent its end. These contact pieces may enter the tube 30 in any suitable manner, one convenient construction is to secure a small metal cap 31 to the tube, at an opening in the latter. The cap is filled with plaster, or similar material, 32, through which passes a platinum contact 33, to which the circuit conductor is soldered, or otherwise connected. The plaster filling of the cap 31 is preferably made concave at the top, so that a small bead of mercury will remain at that point, thereby aiding in the prevention of corrosion of the contact.

A small quantity of mercury is placed in the tube 30. When the temperature is close to that which has been predetermined, the position of the parts will be like that shown in Fig. 2, in which the mercury is connecting the two terminals, and the heating current is thereby established. As the temperature increases, the thermostatic element 17, pressing against the spring 28, will gradually tilt the hanger 20 about the screw 18, until the mercury will suddenly flow into the left-hand end of the tube 30, thereby breaking the connection between the terminals and cutting off the current. This breakage of the circuit will take place suddenly, and without arcing. As the temperature then drops, the hanger will gradually tilt back towards its original position, until the mercury again falls back to the right-hand end of the tube, re-establishing the circuit.

It will be noted that, owing to the location of the terminals, the circuit always remains established, regardless of how much the hanger may be tilted during a dropping of the temperature.

By adjusting the hanger with respect to the bushing 19, the time at which the mercury will fall from one end of the tube to the other can be varied, and thus the temperature at which the switch will operate can be determined. Index marks 34 (Fig. 2) are provided on the hanger, to this end, and are preferably marked with the temperatures at which the switch will operate when the finger 24 is opposite these marks.

Having fully described my invention, what I desire to secure by Letters Patent is:

1. A thermostatic device comprising a thermostatic element, a pivoted hanger, a member associated with said hanger for engagement by said element, a cam member associated with said hanger for adjusting the projection of said member with respect to said hanger, and a mercury tube switch carried by said hanger.

2. A thermostatic device comprising a thermostatic element, a pivoted hanger, a member associated with said hanger for engagement by said element, a cam member associated with said hanger for adjusting the projection of said member with respect to said hanger, an indicating finger associated with said cam member, and a mercury tube switch carried by said hanger.

3. A thermostatic device comprising a base, a thermostatic element associated with said base, a bushing pivoted on said base, a cam member carried by said bushing, a hanger, means for clamping said hanger in adjusted positions upon said bushing, a member associated with said hanger and cooperating with said thermostatic element and said cam member, and a mercury tube switch carried by said hanger.

4. A thermostatic device comprising a base, a thermostatic element associated with said base, a bushing pivoted on said base, a cam member carried by said bushing, an indicating finger carried by said bushing, a hanger, means for clamping said hanger in adjusted positions upon said bushing, whereby said adjustments will be indicated by said finger, a member associated with said hanger and cooperating with said thermostatic element and said cam member, and a mercury tube switch carried by said hanger.

EDMUND SCHERER.